United States Patent [19]

Reimann et al.

[11] 4,303,527

[45] Dec. 1, 1981

[54] SURGE CONTROL IN THE BIOLOGICAL PURIFICATION OF WASTEWATER

[75] Inventors: Hans Reimann, Munich; Alfred Wildmoser, Haar, both of Fed. Rep. of Germany

[73] Assignee: Linde Aktiengesellschaft, Wiesbaden, Fed. Rep. of Germany

[21] Appl. No.: 128,350

[22] Filed: Mar. 10, 1980

[30] Foreign Application Priority Data

Mar. 9, 1979 [DE] Fed. Rep. of Germany ....... 2909333

[51] Int. Cl.³ .............................................. C02F 3/00
[52] U.S. Cl. ................................... 210/614; 210/744; 210/96.1; 210/254; 210/921
[58] Field of Search .............. 210/614, 739, 744, 920, 210/921, 96.1, 254, 257.1

[56] References Cited

U.S. PATENT DOCUMENTS 3,714,036  1/1973  Slater ............................. 210/254 X
3,819,512  6/1974  Prazhovsky et al. ........... 210/921 X
3,875,051  4/1975  Kovarik ........................... 210/744 X
3,892,654  7/1975  Kirk ................................. 210/744 X
3,962,084  6/1976  Nussbaum ...................... 210/921 X Primary Examiner—Thomas G. Wyse
Attorney, Agent, or Firm—Millen & White

[57] ABSTRACT

In a process for the biological purification of wastewater wherein the wastewater is treated in a purification plant comprising at least one storage tank and at least one biological treatment stage, the improvement wherein the entering wastewater, in case of normal load, is introduced directly into the biological treatment stage and, during the time period of peak loads, is introduced at least partially into the storage tank; and that, after the subsiding of the peak loads, the wastewater is transferred from the storage tank into the biological treatment stage. A process variable associated with the biological treatment stage, such as oxygen, or one associated with incoming wastewater such as BOD, is used to automatically regulate the timing of the flows.

11 Claims, 3 Drawing Figures

SURGE CONTROL IN THE BIOLOGICAL PURIFICATION OF WASTEWATER

BACKGROUND OF THE INVENTION

This invention relates to a process for the biological purification of wastewater wherein the wastewater is treated in a purification plant comprising at least one storage tank and at least one biological treatment stage, as well as to an apparatus for conducting the process.

In the biological purification of wastewater, a storage tank is conventionally connected upstream of a biological treatment stage, the latter usually comprising a trickling filter or an aeration tank. By passing entering wastewater first to the storage tank and then to the biological treatment stage, it is usually possible to compensate for the fact that the wastewater is not constant relative to flow rate and/or composition. To achieve the desired relatively constant values regarding quantity and concentration of waste in the effluent leaving the storage tank, the storage tank must be very large on the one hand and optimally should be equipped with blending means for the wastewater, for example, with agitators. There are limits, however, to the provision of such storage tanks or lagoons in many cases, due to the fact that the acreage required is either unavailable or the cost of the land is prohibitive. Furthermore, the use of agitation or the like for the storage tanks results in not only increased investment costs, but also substantially increased operating and maintenance costs.

SUMMARY OF THE INVENTION

An object of this invention is to provide a process for the biological purification of wastewater of the type discussed hereinabove, as well as corresponding apparatus, wherein the storage tank problem outlined above is ameliorated, and in particular by incorporating a fluid control system which permits the use of relatively smaller tanks.

Upon further study of the specification and appended claims, further objects and advantages of this invention will become apparent to those skilled in the art.

To attain these objects, a process and associated apparatus is provided wherein the entering wastewater, in the case of a normal load, is directly introduced into the biological treatment stage and, during a period of peak loads, is introduced at least partially into the storage tank; and after the peak loads have diminished, the wastewater is transferred from the storage tank into the biological treatment stage in a controlled or regulated fasion.

Since the wastewater conducted to the wastewater purification plant is to be fed into the storage tank only in case of peak loads, the storage tank can be dimensioned relatively smaller without deleterious effects on the performance of the biological treatment stage resulting from excessive fluctuations in the concentration of waste the wastewater to be processed.

To assure proper performance in the biological treatment stage, it is advantageous to utilize as a control parameter the oxygen concentration present in the liquid of the biological treatment stage. The procedure, in this connection, is preferably to predetermine a minimum value, intermediate value, and a maximum value for the oxygen concentration present in the liquid of the biological treatment stage. If the oxygen concentration drops below the minimum value, the entering wastewater is passed into the storage tank; if the intermediate value is exceeded, introduction into the storage tank is cut off; and if the maximum value is exceeded, the wastewater is transferred from the storage tank into the biological treatment stage.

Instead of, or also in combination with the introduction of the entering wastewater into the storage tank and the transfer of the wastewater from the storage tank into the biological treatment stage in dependence on the oxygen concentration of the liquid, it is also possible according to another aspect of this invention to effect the introduction of the entering wastewater into the storage tank, and the transfer of the wastewater from the storage tank into the biological treatment stage at least in part in dependence on a specific concentration and/or concentration-analogous variable in the entering wastewater. In this connection, the content of impurities in the wastewater fed to the purification plant can be determined, for example, by detecting the amount of organic impurities carried along with the wastewater within a certain period of time, or by determining the undissolved matter contained in the wastewater, or by measuring the BOD (biological oxygen demand) and/or COD (chemical oxygen demand). The preferred parameter is the TOD (total oxygen demand). With this parameter it is possible to measure the oxidizability of the organic materials in the wastewater fed to the purification plant. This oxidizability is nearly proportional to the actual oxygen consumption in the biological treatment stage.

The procedure in this case is preferably such that a maximum value, an intermediate value, and a minimum value are given for the concentration and/or concentration-analogous variable present in the entering wastewater, and that, upon exceeding the maximum value, the step of introducing the entering wastewater into the storage tank is conducted; when the determined value falls below the intermediate value, the step of passing of wastewater into the storage tank is cut off; and when the determined value falls below the minimum value, the wastewater is transferred from the storage tank into the biological treatment stage.

An apparatus for conducting the process comprises a wastewater purification plant having at least one storage tank with an inlet and at least one biological treatment stage with an outlet, and the biological treatment stage is in communication with the storage tank. According to the invention, such an apparatus is characterized by the inlet to the storage tank comprising a branch conduit to the biological treatment stage; a measuring device arranged in the biological treatment state to determine the dissolved oxygen, and/or a concentration analyzer disposed in the inlet; and the measuring device and/or the concentration analyzer in communication with a regulating and control device for regulating or controlling the feed of the wastewater to the storage tank and the transfer of the wastewater from the storage tank into the biological treatment stage.

With such a construction of the apparatus, it is possible to conduct the wastewater, in the case of a normal load, via the branch conduit directly into the biological treatment stage and, in case of peak loads, at least partially into the storage tank. Likewise, one can select, in this procedure, the oxygen concentration of the liquid contained in the biological treatment stage and/or the concentration of the waste in the wastewater entering the wastewater purification plant as the governing variable for the introduction and/or transfer of the wastewater into the storage tank or into the biological treatment stage. Due to the fact that the wastewater is not fed into the storage tank in case of normal load, it is possible to utilize a relatively small storage tank, which need not be larger than the trickling filter or aeration tanks utilized in the biological treatment stage, without there being the danger of interfering with the biological reaction in the biological treatment stage because of fluctuations in the concentration of the entering wastewater.

To be able to effect the feeding of the wastewater into the storage tank, and the transfer of the wastewater from the storage tank into the biological treatment stage in correspondence with the measured values transmitted by the oxygen measuring device and/or the concentration analyzer to the regulating and control unit, and being compared therein with the desired values, the regulating and control unit advantageously acts either on the position of an automatic gate valve arranged in the inlet and/or in the branch conduit as well as on the output of a pump arranged in the connection line between the storage tank and the biological treatment stage. As an alternative, according to another advantageous embodiment, the regulating and control unit acts on the output of a pump arranged in the inlet, as well as acting on the position of an automatic gate valve arranged in the connection line between the storage tank and the biological treatment stage.

The preferred automatic control is of an electrical type. The automatic gate valve is driven by an electric motor which has end or outside connections. Additionally the pump is driven by an electric motor having a gear unit interposed therebetween. An electric servo motor associated with the gear unit operates to vary the output of the pump. The servo motor of the pump and the motor of the gate valve are connected to the regulating and control unit, which is a three-stage step controller.

DETAILED DESCRIPTION OF FIGURES

Figure 1:
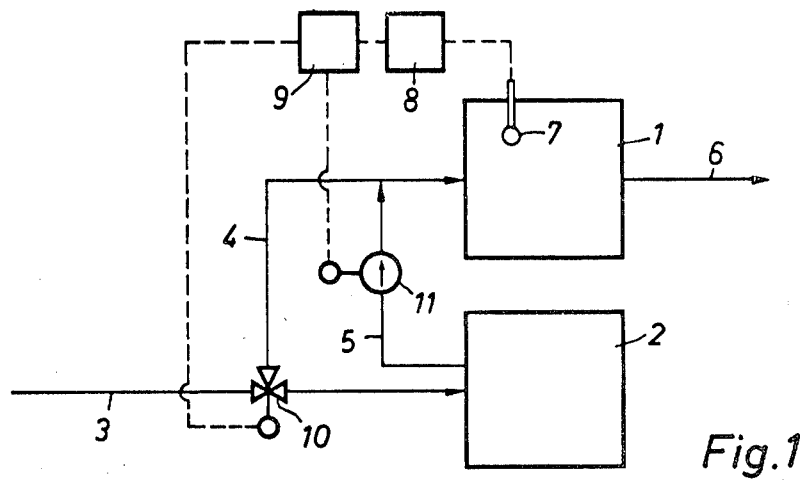
FIG. 1 illustrates, in schematic form, a wastewater purification plant having a biological treatment stage and storage tank wherein the introduction of the wastewater into the biological treatment stage and the storage tank, as well as the transfer of the wastewater from the storage tank into the biological treatment stage, are conducted as a function of the oxygen content of the liquid present in the biological treatment stage.

In the Figures, in a biological wastewater purification plant, 1 denotes an aeration tank of a biological treatment stage and 2 denotes a storage or surge tank. The storage tank 2 is dimensioned to be of not greater in working volume than the aeration tank 1. An inlet 3 for wastewater is connected to the storage tank 2, this inlet comprising a branch conduit 4 to the aeration tank 1. From the storage tank 2, a connecting conduit 5 leads to the aeration tank 1, the latter, in turn, comprising an outlet 6 to discharge the treated wastewater into a settling tank, not shown, pertaining to the biological treatment stage. It is, of course, also possible to provide a trickling filter in place of the aeration tank 1.

In the embodiment of FIG. 1, a measuring device 7 to determine the oxygen content dissolved in the liquid is arranged in the aeration tank 1, this device being, for example, a membrane polarometric oxygen electrode (manufacturer: WTW, Weilheim). By means of this oxygen electrode, a galvanic element composed of two electrodes gives the current intensity proportional to the oxygen concentration.

This measuring device is, in turn, connected to amplifier 8 to the input side of a regulating and control unit 9. The amplifier effects a current amplification of the signal from the oxygen electrode, which normaly is only 20 mA. (manufacturer: WTW, Weilheim). The regulating and control unit 9 is a three-stage step controller. An automatic gate valve 10 blocking the inlet 3 and the branch conduit 4 as well as a pump 11 installed in the connecting line 5 between storage tank 2 and aeration tank 1 are connected to the output side of the regulating and control unit 9. The automatic gate valve 10 is driven by an electric motor which has end connections. The current supply to the electric motor is regulated from the regulating and control unit so that the automatic gate valve opens or closes in a stepwise manner.

Figure 2:
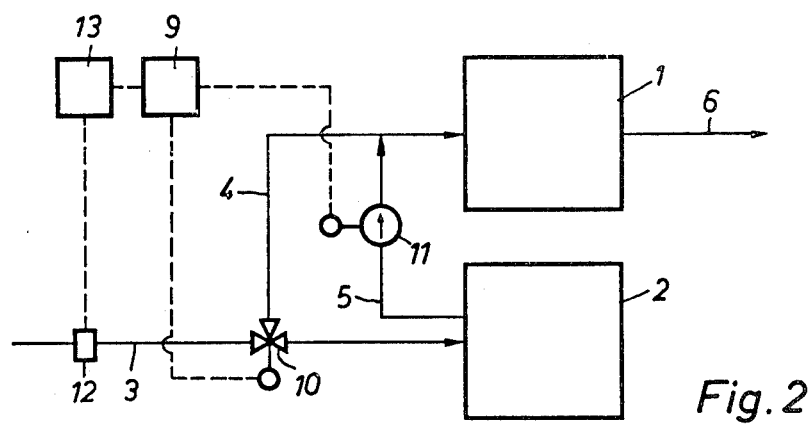
FIGS. 2 and 3 both, in schematic form, illustrate a wastewater purification plant having a biological treatment stage and storage tank wherein the introduction of the wastewater into the biological treatment stage and into the storage tank, as well as the transfer of the wastewater from the storage tank into the biological treatment stage, are effected in dependence on the concentration of waste in the wastewater fed to the wastewater purification plant.

In the embodiment of FIG. 2, a measuring device 12 of a concentration analyzer 13 is disposed in the inlet 3 for the wastewater, instead of the measuring device to determine the oxygen content dissolved in the liquid arranged in the aeration tank 1; the output of this analyzer is connected to the input of the regulating and control unit 9 so that in this case the concentration of waste in the wastewater in the inlet 3 is utilized as the measuring variable. The concentration analyzer 13 measures the oxidizability of the organic materials in the wastewater fed to the purification plant.

Figure 3:
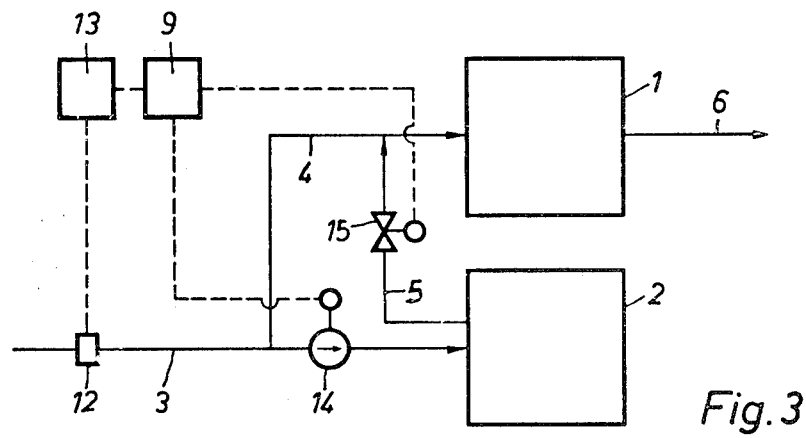

As contrasted to the embodiment of FIG. 2, the embodiment of FIG. 3 shows that a pump 14 is installed in the inlet 3 of the wastewater to the storage tank 2 and an automatic gate valve 15 is installed in the connecting line 5 between the storage tank 2 and the aeration tank 1. Both components are connected to the output side of the regulating and control unit 9.

In all three embodiments, three desired values are set in the regulating and control unit 9; these values can be predetermined on the basis of the design data of the wastewater purification plant and correspond to a maximum value, an intermediate value, and a minimum value of either the oxygen content in the wastewater-activated sludge mixture in the aeration tank 1 or the concentration of waste of the wastewater in the inlet 3. The intermediate value is set at the normal load condition of the wastewater purification plant.

The process of the invention will be described below with reference to the embodiment of a wastewater purification plant illustrated in FIG. 1. It is assumed, first of all, that the wastewater purification plant is operated under normal conditions, and the oxygen content of the wastewater-activated sludge mixture present in the aeration tank 1 is in equilibrium. The actual value signal transmitted by the measuring device 7 via the amplifier 8 to the regulating and control unit 9 then corresponds to the intermediate value set in the regulating and control device 9. By means of a control signal, the automatic gate valve 10 is thereby operated so that the inlet to the storage tank 2 is closed and the branch conduit 4 to the aeration tank 1 is open. By means of the same control signal, the pump 11 in the connecting line 5 between the storage tank 2 and the aeration tank 1 is cut off, so that the entering wastewater is directly introduced only into the aeration tank 1.

If the oxygen content in the wastewater-activated sludge mixture in the aeration tank 1 drops as a result of an increasing concentration of waste in the entering wastewater, the actual value signal of the measuring device 7 is smaller than the given intermediate value, and by means of the comparison value obtained in the regulating and control device 9, a control signal is transmitted to the automatic gate valve 10, and the inlet 3 to the storage tank 2 is opened. If the oxygen content in the wastewater-activated sludge mixture of the aeration tank 1 drops below the predetermined minimum value for the oxygen content, in case of peak load, then the automatic gate valve 10 is adjusted via a control signal form the regulating and control unit 9 so that the branch conduit 4 is closed. When the minimum value for the oxygen content is exceeded, the branch conduit 4 is opened again, and when the intermediate value has been reached, the inlet 3 to the storage tank 2 is closed.

If the oxygen content in the wastewater-activated sludge mixture of the aeration tank 1 rises above the intermediate value, with a dropping concentration of the entering wastewater, the pump 11 in the connecting line 5 is turned on by way of a corresponding control signal of the regulating and control unit 9, and wastewater is conducted from the storage tank 2 into the aeration tank 1. The rate of pumping of the pump 11 is determined and adjusted in proportion to the measured oxygen content in the wastewater-activated sludge mixture of the aeration tank 1. When the oxygen content exceeds the given maximum value for the oxygen content, maximum power is supplied to the pump 11. The pump 11 is driven by an electric motor having an interposed gear unit between the pump 11 and the electric motor. For the purpose of varying the output of the pump, the gear unit includes an electric servo motor. The servo motor is connected to the regulating and control unit 9. Thereby, the regulating and control unit 9 regulates the current supply to the servo motor so that the power of the pump can be raised in a stepwise manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

SPECIFIC EXAMPLE

Specific example for a dairy-wastewater:
constant wastewater flow: 100 m$^3$/h
normal BOD$_5$-concentration: 1000 mg/l
normal BOD$_5$-load: 100 kg/h
volume of the aeration tank: 960 m$^3$
volume of the storage tant: 100 m$^3$
aeration time: 9.6 h
minimum value for oxygen concentration (DO): 0.5 mg/l
maximum value for oxygen concentration: 3.0 mg/l
intermediate value for oxygen concentr.: 2.0 mg/l For 1 hour the BOD-load changes from 100 kg/h to 200 kg/h in the inlet line 3. Therefore, the oxygen demand rises to nearly double the normal value. This demand is satisfied by increasing the aerator capacity, e.g. by increasing the rotational speed of the aeration turbine. In the next hour, the BOD-load rises to 300 kg/l in the inlet line 3. The Do in the aeration tank falls to the minimum value of 0.5 mg/l. Then the regulating and control unit operates the automatic gate valve so, that the inlet to the storage tank is opened stepwise, and the inlet to the aeration tank is closed stepwise. In the equilibrium stage of the control unit, 33 m$^3$/h are going to the storage tank, and 67 m$^3$/h to the aeration tank. After this hour, the BOD-load in the inlet line 3 drops to 100 kg/h. Within 10 min. the DO returns to the medium value, whereby the line to the storage tank is closed stepwise, and the other line to the aeration tank is fully opened stepwise. After another 10 min., and before the maximum DO-value is reached, the control unit operates the pump in the connecting line between the storage tank and the aeration tank, so that within another 1 h the content of 33 m$^3$ of the storage tank is introduced into the aeration tank. During this last hour the load is 199 kg/h to the aeration tank. After this hour, it drops to 100 kg/h in the branch conduit 4 so that the aeration capacity can be reduced to the normal value.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. In a process for the biological purification of wastewater wherein the wastewater is treated in a purification plant including at least one storage tank and at least one biological treatment stage, the improvement comprising the steps of:
predetermining a minimum value, an intermediate value, and a maximum value level for at least one of a specific concentration and a concentration-analogous variable of the entering wastewater;
introducing entering wastewater directly into the biological treatment stage when at least one of a specific concentration and a concentration analogous variable of the entering wastewater is equal to said intermediate value level, said intermediate value level corresponding to a normal load on the purification plant;
at least partially introducing entering wastewater into the storage tank when the at least one of a specific concentration and a concentration analogous variable of the entering wastewater exceeds said maximum value level, said maximum value level corresponding to a peak load on the purification plant; and
transferring stored wastewater in the storage tank to the biological treatment stage when the at least one of a specific concentration and a concentration-analogous variable of the entering wastewater is below said minimum value level, said minimum value level corresponding to the peak load on the purification plant having subsided.

2. In a process as in claim 1 wherein the at least one of a specific concentration and a concentration-analogous variable comprises a variable corresponding to the oxidizability of organic materials in the wastewater.

3. In a process as in claim 1 wherein the at least one of a specific concentration and a concentration-analogous variable comprises a variable corresponding to the amount of the undissolved matter in the wastewater.

4. In a process for the biological purification of wastewater wherein the wastewater is treated in a purification plant including at least one storage tank and at least one biological treatment stage, the improvement comprising the steps of:

predetermining a minimum value, an intermediate value, and a maximum value level for oxygen concentration of the liquid in the biological treatment stage;

introducing entering wastewater directly into the biological treatment stage when the oxygen concentration in the liquid in the biological treatment stage is equal to said intermediate value level, said intermediate value level corresponding to a normal load on the purification plant;

at least partially introducing entering wastewater into the storage tank when the oxygen concentration in the liquid in the biological treatment stage is below said minimum value level, said minimum value level corresponding to a peak load on the purification plant; and transferring stored wastewater in the storage tank to the biological treatment stage when the oxygen concentration in the liquid in the biological treatment stage is equal to a value exceeding said maximum value level, said maximum value level corresponding to the peak load on the purification plant having subsided.

5. An apparatus for controlling surges in a wastewater purification plant, comprising: at least one storage tank (2) having an inlet (3) and at least one biological treatment means having an outlet, said biological treatment means in communication with said storage tank, and said inlet (3) of said storage tank (2) comprising a branch conduit (4) connected to a biological treatment stage (1); a measuring device (7) arranged in said biological treatment means for determining the dissolved oxygen of the wastewater therein; and said measuring device (7) connected to regulating and control means (9) for regulating and controlling the flow of wastewater through inlet (3) to the storage tank (2), and the transfer of wastewater from said storage tank (2) into said biological treatment stage (1).

6. An apparatus according to claim 5 or 11, further comprising an automatically controlled gate valve (10) connected to said regulating and control unit (9) for controlling the position of said automatic gate valve (10), said valve (10) being arranged in at least one of the inlet (3) and the branch conduit (4), said regulating and control unit (9) further comprising adjusting means for adjusting the power supplied to a pump (11) arranged in the connecting line (5) between the storage tank (2) and the biological treatment stage (1).

7. An apparatus for controlling surges in a wastewater purification plant, comprising:

at least one storage tank (2) having an inlet (3), and at least one biological treatment means having an outlet, said biological treatment means in communication with said storage tank, and said inlet (3) of said storage tank (2), comprising a branch conduit (4) connected to a biological treatment stage (1); a concentration analyzer (12, 13) arranged in said inlet (3); and said concentration analyzer (12, 13) connected to regulating and control means (9) for regulating and controlling the flow of the wastewater through inlet (3) to the storage tank (2), and the transfer of wastewater from said storage tank (2) into said biological treatment stage (1).

8. An apparatus as in claim 7 wherein said concentration analyzer (12, 13) comprises means for measuring the oxidizability of organic materials in the wastewater.

9. An apparatus as in claim 7 wherein said concentration analyzer (12, 13) comprises means for measuring the amount of undissolved matter in the wastewater.

10. An apparatus according to claim 5 or 7, wherein the regulating and control unit (9) comprises adjusting means for adjusting the power supplied to a pump (14) arranged in the inlet (3), and for adjusting the position of an automatic gate valve (15) arranged in the connecting line (5) between the storage tank (2) and the biological treatment stage (1).

11. An apparatus as in claim 5 or 7 wherein said storage tank has a volume capacity no greater than the volume capacity of the biological treatment stage (1).

* * * * *